June 3, 1941.  F. AJERO  2,244,509
HYDRAULIC TRANSMISSION
Filed May 18, 1939   3 Sheets-Sheet 1
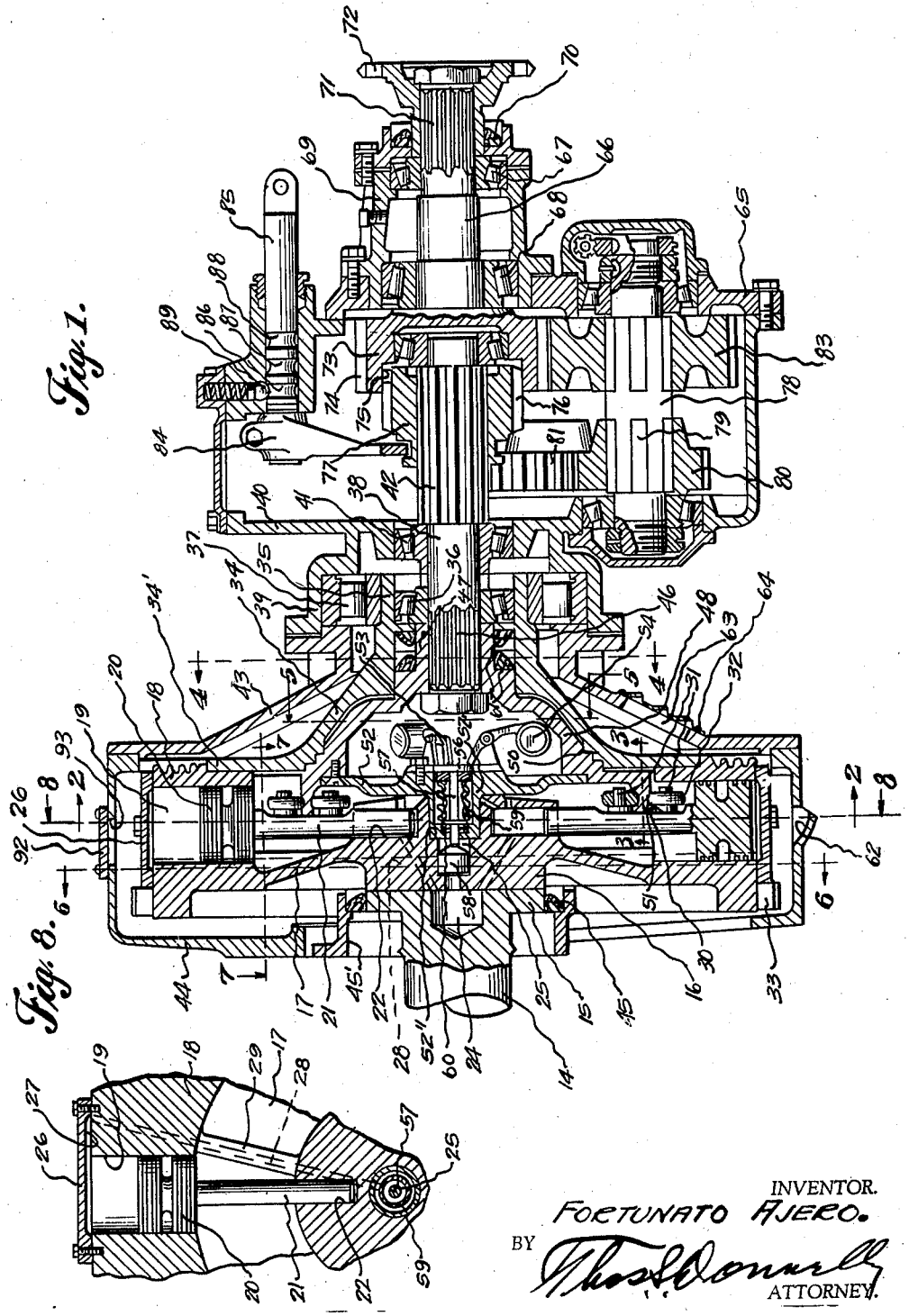
INVENTOR.
FORTUNATO AJERO.
BY
ATTORNEY.

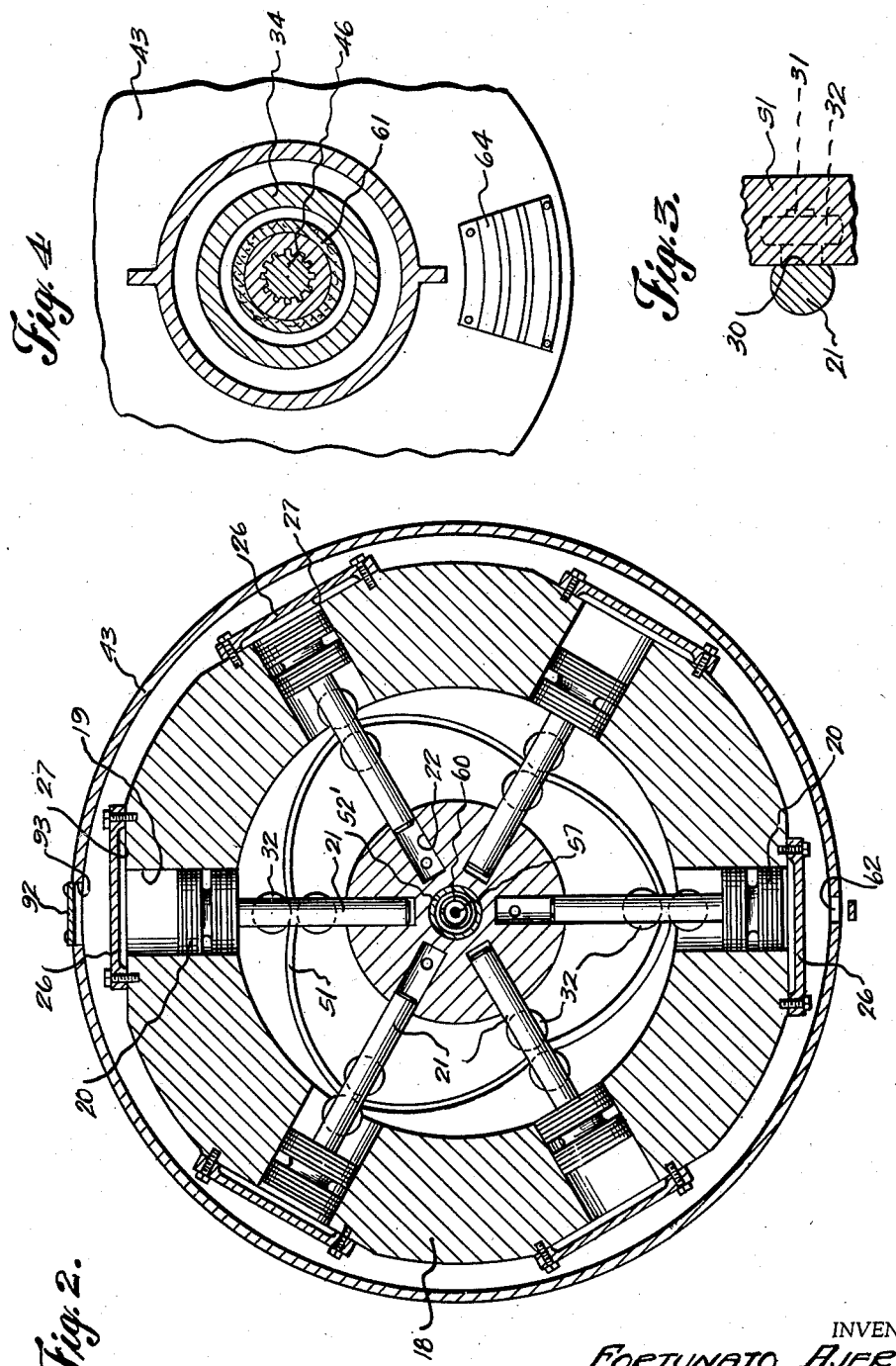

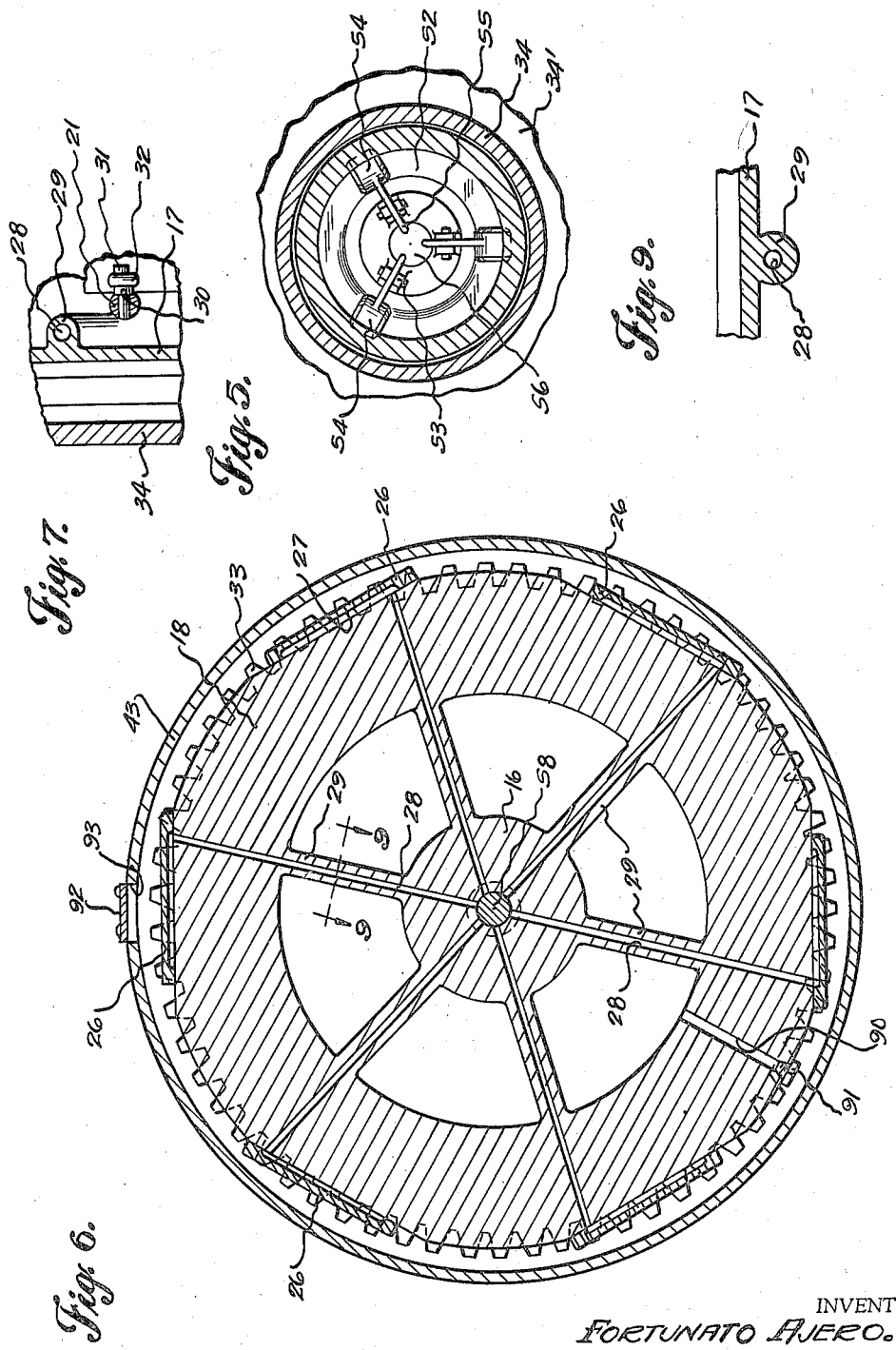

Patented June 3, 1941

2,244,509

UNITED STATES PATENT OFFICE 2,244,509

HYDRAULIC TRANSMISSION

Fortunato Ajero, Detroit, Mich., assignor of one-fourth to Alfred J. Moran, Detroit, Mich.

Application May 18, 1939, Serial No. 274,377

6 Claims. (Cl. 192—60)

My invention relates to a new and useful improvement in an hydraulic transmission adapted for transmitting rotary motion from one body to another. It is an object of the present invention to provide a mechanism whereby a rotating shaft may transmit rotary motion to a transmitting or driven shaft in connection with a control mechanism which will control the degree of transmission so that while the driving shaft may be rotating at a certain speed, the transmitting shaft may be rotating at any speed equal to or below the speed of the driving shaft.

Another object of the invention is the provision of a driving shaft provided with a mechanism connecting it to a transmitting shaft embodying reciprocating members so arranged and constructed that as the reciprocation of the reciprocating members is retarded, the speed of the transmitting shaft is increased until, when the reciprocating members are held stationary, the transmitting shaft rotates in unison with the driving shaft.

Another object of the invention is the provision in a mechanism of this class of a driving shaft and a transmitting shaft provided with interconnecting mechanisms so arranged and constructed that as the speed of the driving shaft is increased, the speed of the transmitting shaft is gradually increased until it rotates in unison with the driving shaft.

Another object of the invention is the provision of a mechanism of this class embodying a driving shaft carrying a plurality of reciprocating members, reciprocal by means carried on the transmitting shaft, and provided with means operable in response to the speed of rotation of the transmitting shaft for gradually retarding the reciprocation of said reciprocating members to thereby raise the speed of the transmitting shaft to approach the speed of the driving shaft.

Another object of the invention is the provision in a mechanism of this type of a driving shaft and a transmitting shaft provided with interconnecting mechanisms so arranged and constructed that the transmitting shaft may be gradually caused to rotate upon the rotation of the driving shaft and the speed of the transmitting shaft gradually increased until it equals the speed of rotation of the driving shaft.

Another object of the invention is the provision in a mechanism of this type of a means of transmitting rotary power from one body to another so as to avoid sudden impulses or increases of delivery and to provide a gradual and easy increase in speed of rotation.

Another object of the invention is the provision of a device of this class which will be simple in structure, economical of manufacture, durable, compact, easily and quickly installed, possessed of a minimum number of parts, and highly efficient in use.

Other objects will appear hereinafter.

In the drawings I have illustrated a specific form of structure embodying the invention but from the description given, it will be obvious that various changes and modifications in the structure may be made without departing from the spirit of the invention and it is my intention that such variations and changes shall be brought within the scope of the claims which are attached hereto.

For the purposes of explaining more clearly the invention, the specification herein is supplemented by drawings in which, Fig. 1 is a central longitudinal vertical sectional view of the invention, Fig. 2 is a sectional view taken on line 2—2 of Fig. 1, Fig. 3 is a sectional view taken on line 3—3 of Fig. 1, Fig. 4 is a fragmentary sectional view taken on line 4—4 of Fig. 1, Fig. 5 is a sectional view taken on line 5—5 of Fig. 1, Fig. 6 is a sectional view taken on line 6—6 of Fig. 1, Fig. 7 is a sectional view taken on line 7—7 of Fig. 1, Fig. 8 is a sectional view taken on line 8—8 of Fig. 1, Fig. 9 is a sectional view taken on line 9—9 of Fig. 6.

In the drawings I have illustrated the invention used with a driving shaft 14 which may constitute the crank shaft, or an engine, or the like. This shaft 14 carries a head or flange 15 which is fixedly connected to the hub 16 of the disk 17 carrying on one face at its perimeter the outwardly projecting rib 18 in which are formed the spaced openings 19 to provide cylinders. In each of these cylinders is slidably mounted a piston 20 carrying a piston rod 21, the end of which engages in a socket 22 formed in the hub 16. A bleed passage communicates with the socket 22 and with the recess 24 formed in the end of the shaft 14. This recess 24 communicates through a passage with the pocket or chamber 25 formed in the hub 16.

A cover 26 is provided for each of the cylinders 19, this cover being bolted or otherwise suitably secured to the periphery of the rib 18. The under surface of the cover is dished out as at 27 so that the cylinder 19 may communicate with the outlet passage 28 which extends through a radially directed rib 29 which is formed on the face of the disk 17. This passage 28 continues through the hub 16 so as to communicate with the chamber 25.

Each of the piston rods 21 is cut away on one side intermediate its ends to provide the flat surface 30. Projecting outwardly from the piston rod at the flat surface are spaced apart studs 31 on each of which is rotatably mounted a roller 32. Teeth 33 are formed on the periphery of the disk 17, these teeth constituting a gear which commonly meshes with a timing gear used on internal combustion engines. A bell-shaped housing 34 is provided terminating at its open end in a radially directed flange portion 34' which is secured to the face of the rib 18. This bell-shaped housing 34 is provided with a cylindrical neck or housing 35 which rotates on the bearings 36 and 37, the bearing 36 being positioned within the neck 35 and embracing a portion of a transmitting shaft 38. The bearing 37 embraces the neck 35 and is positioned within a cup-shaped housing 39 projecting outwardly from the housing wall 40, this housing serving to enclose the gears used in the transmission. The wall 40 serves as a journal for the bearing 41 through which the shaft 38 projects, this shaft 38 having a splined portion 42 positioned within the gear housing. The housing 39 abuts against and is secured to the housing wall 43, this wall 43 serving as a closure for the housing 44 which is cup-shaped and suitably secured stationary to the engine block or any other suitable support. A suitable oil seal 45 is positioned between the periphery of the flange 15 and an opening 45' formed in the base of the housing 44. A splined portion 46 of the transmitting shaft 38 is extended through the housing or cylindrical neck 47 of the swash drum 48. This swash drum 48 is provided with a plurality of spaced grooves in which engage the ribs 50 formed on the cover 34, these ribs engaging in these grooves serving as oil seals to prevent passage of oil around the exterior of the swash drum. The swash drum is provided on its face with an axially directed cam flange 51 having a curved groove on its inner face and outer face. This cam flange engages between the pairs of rollers 32.

A plate 52 serves as a closure for the swash drum. This plate 52 is provided with a central extension 52' which seats in a pocket 52'' formed in the hub 16 so that the swash drum is thus centered relatively to the hub 16, the neck 47 of this swash drum thus cooperates in maintaining the transmitting shaft 38 centered relatively to the driving shaft 14.

Projecting inwardly from the cover 52 of the swash drum are lugs 53 on which is pivoted a governor having the weight 54 at the outer end thereof and adapted upon rocking of the weight outwardly for contacting at its end 55 with the disk 56 carried on one end of the rod 57, the opposite end of which is attached to the valve plug 58 slidably mounted in the chamber 24. This rod 57 projects through the compressible or bellows oil seal 59 against which bears one end of a spring 60, the other end thereof bearing against the base of the extension 52'. The spring serves to normally maintain the valve plug 58 in position for uncovering the ends of the passages 28. Oil seals 61 are positioned about the neck 47. A ventilating opening 62 is formed in the housing 44 to permit entry of air thereinto for cooling purposes. A wall 34 is provided with an opening 63 over which is mounted the louvre bearing plate 64 which will also permit entry of air into the interior of the housing 44.

Mounted on and projecting outwardly from the wall 65 of the gear box or housing is an extension housing 69 which supports bearings 67 and 68 through which extends the driven shaft 66. An oil seal 70 is positioned about the shaft 66 which carries the splined portion 71 and on which is fixedly mounted a transmitting gear 72.

Formed preferably integral with the shaft 66 or the inner end thereof, within the gear box or housing, is a head 73 having teeth 74 formed on its periphery and provided on its face with an internal gear 75. This internal gear 75 is adapted for meshing with the teeth 76 of the gear 77 which is slidably mounted on the splined portion 42 of the transmitting shaft.

Mounted on the gear housing is a shaft 78 having a splined portion 79 on which is mounted the gear 80 adapted for meshing with the idler gear 81. This idler gear 81 is adapted for being driven by the gear 77 when the gear 77 is brought into mesh therewith. When the gear 81 is rotating, the shaft 78 will be rotated as will likewise the gear 83. This gear 83 meshes with the peripheral teeth on the gear 73.

The gear 77 may be slid axially of the splined portion 42, so as to mesh either with the internal gear 75 or mesh with the gear 81, by means of the shifting yoke or fork 84 carried by the slidable rod 85. This rod is provided with three circumferentially extending grooves 86, 87 and 88 into each of which is adapted to project the spring pressed ball 89. In the form shown in Fig. 1, the gear 77 is meshing with the internal gear 75. By moving the rod 85 to the left of the drawing until the ball 89 snaps into the groove 87, the gear 77 would be moved to neutral position, out of mesh with the internal gear 75. By moving the rod 85 farther until the ball 89 snaps into the groove 88, the gear 77 would be brought into mesh with the gear 81. Thus there is a very simple and effective means of controlling the direction of rotation of the driven shaft, the driven shaft rotating in unison with the transmitting shaft 38.

In operation, when the engine is being operated, the shaft 14 will be rotated and when the engine is at idling speed, the swash drum 48 will remain stationary. As the shaft 14 rotates and thereby effects a rotation of the disk 17, the pistons will be reciprocated. As shown clearly in Fig. 1 and in Fig. 2, the pistons are arranged in pairs diametrically opposite each other. As the pistons reciprocate, one piston will be moving outwardly when its oppositely positioned piston will be moving inwardly. Formed in the rib 18 is a filler passage 90 closed by closure 91 and accessible through the opening 93 formed in the housing 44 which is covered by the cover 92. A suitable liquid is deposited through the passage 90 until the system is filled. When the piston moves outwardly, it will force the liquid in the cylinder outwardly through the passage 28 which is in communication therewith. This liquid will flow into the chamber 25 and thence through a passage 28 into the oppositely positioned cylinder. The cross-section area of the passage 28 is such that when the engine is run at idling speeds, a free reciprocation of the pistons may be effected. As the speed of rotation of the shaft 14 increases, which would have a tendency to increase the speed of reciprocation of the pistons 20, the passage 28 will not be sufficient to accommodate the volume of liquid forced from the cylinder with the result that the pistons will be retarded in their reciprocating movements. The disk 17, however, will continue to rotate. The retarded pistons will then transmit through the rollers 32, a rotating action to the cam flange 35 of the swash drum, thus causing the transmitting shaft 38 to gradually begin to rotate. As the speed of the shaft 14 is further increased, the swash drum 48 will be speeded up in its rotation sufficiently to swing the weights 54 of the governors outwardly and force the ends 55 inwardly to move the valve plug 58 into position to close the ends of the passages 28. When the ends of these passages 28 are entirely closed, the reciprocation of the pistons will be prevented and in such an instance, the swash drum 48 will rotate in unison with the shaft 14, thus effecting a rotation of the transmission shaft 38 in unison with the driving shaft 14.

It is believed obvious that there is thus provided a transmission having an infinite variation of transmission. The transmission is hydraulic and its operation dependent upon the free flow of the liquid with which the system is filled. By varying the effective sizes of the passages 28, the idling speed at which the engine may idle may be varied. It is obvious also that by varying the weight of the members 54, or by changing or varying the distance of travel of the plug 58, or the sides of the outlet openings of the passages 28, the speed at which the transmitting shaft will rotate in unison with the driving shaft may be varied and controlled. It will be noted that there is an inward and an outward thrust delivered to the swash drum by using the rollers engaging on opposite sides of the cam flange 51.

It is believed that the simplicity of operation is apparent from the description given and that various advantages sought to be obtained are present, while the disadvantages referred to have been avoided.

What I claim as new is:

1. In an hydraulic transmission of the class described: a driving shaft; a hub mounted on said driving shaft concentrically thereof and rotating in unison therewith; a plurality of spaced cylinders arranged circumferentially about said hub and carried thereby and opening at their inner ends into a common space, said hub having a radially directed pocket formed in alignment with each of said cylinders; a piston slidably mounted in each of said cylinders; a piston rod connected to each of said cylinders and connected inwardly therefrom and slidably engaging at its end in a pocket in said hub, said cylinders being adapted for the reception of liquid; a conduit for connecting the outer ends of oppositely disposed cylinders in communication with each other; a valve interposed in said conduit for controlling communication of the outer ends of oppositely disposed cylinders with each other; a transmitting shaft; a swash drum mounted on said transmitting shaft and rotatable in unison therewith; a cam on said swash drum; and means carried by each of said piston rods engageable with said cam for effecting a reciprocation of said pistons upon rotation of said driving shaft.

2. In an hydraulic transmission of the class described: a driving shaft; a hub mounted on said driving shaft concentrically thereof and rotating in unison therewith; a plurality of spaced cylinders arranged circumferentially about said hub and carried thereby and opening at their inner ends into a common space, said hub having a radially directed pocket formed in alignment with each of said cylinders; a piston slidably mounted in each of said cylinders; a piston rod connected to each of said cylinders and connected inwardly therefrom and slidably engaging at its end in a pocket in said hub, said cylinders being adapted for the reception of liquid; a conduit for connecting the outer ends of oppositely disposed cylinders in communication with each other; a valve interposed in said conduit for controlling communication of the outer ends of oppositely disposed cylinders with each other; a transmitting shaft; a swash drum mounted on said transmitting shaft and rotatable in unison therewith; a cam on said swash drum; means carried by each of said piston rods engageable with said cam for effecting a reciprocation of said pistons upon rotation of said driving shaft, the movement of said valve to closing position effecting a retarding of the reciprocation of said pistons; and the movement of said valve to fully closed position rendering said pistons non-reciprocating, said cam engaging means effecting upon the retarding of the reciprocation of said pistons a rotation of said swash drum, said swash drum upon the movement of said valve to fully closed position rotating in unison with said driving shaft.

3. In an hydraulic transmission of the class described: a driving shaft; a hub mounted on said driving shaft concentrically thereof and rotating in unison therewith; a plurality of spaced cylinders arranged circumferentially about said hub and carried thereby and opening at their inner ends into a common space, said hub having a radially directed pocket formed in alignment with each of said cylinders; a piston slidably mounted in each of said cylinders; a piston rod connected to each of said cylinders and connected inwardly therefrom and slidably engaging at its end in a pocket in said hub, said cylinders being adapted for the reception of liquid; a conduit for connecting the outer ends of oppositely disposed cylinders in communication with each other; a valve interposed in said conduit for controlling communication of the outer ends of oppositely disposed cylinders with each other; a transmitting shaft; a swash drum mounted on said transmitting shaft and rotatable in unison therewith; a cam on said swash drum; means carried by each of said piston rods engageable with said cam for effecting a reciprocation of said pistons upon rotation of said driving shaft, the movement of said valve to closing position effecting a retarding of the reciprocation of said pistons; and the movement of said valve to fully closed position rendering said pistons non-reciprocating, said cam engaging means effecting upon the retarding of the reciprocation of said pistons a rotation of said swash drum, said swash drum upon the movement of said valve to fully closed position rotating in unison with said driving shaft; and centrifugally operated means carried by said swash drum for, upon the rotation of said swash drum above a predetermined speed, moving said valve to closing position.

4. In an hydraulic transmission of the class described: a driving shaft; a hub mounted on said driving shaft concentric thereof and rotatable in unison therewith; a plurality of spaced cylinders arranged circumferentially about said hub and carried thereby and opening at their inner ends into a common space; a piston slidably mounted in each of said cylinders; a piston rod connected to each of said cylinders; guide means on said hub for each of said piston rods for guiding the same upon slidable movement of the pistons, said cylinders being adapted for the reception of liquid; a conduit for connecting the outer ends of oppositely disposed cylinders in communication with each other; a valve interposed in said conduit for controlling communication of the outer ends of oppositely disposed cylinders with each other; a transmitting shaft; a swash drum mounted on said transmitting shaft and rotatable in unison therewith; a cam on said swash drum; and means carried by each of said piston rods engageable with said cam for effecting a reciprocation of said pistons upon rotation of said driving shaft.

5. In an hydraulic transmission of the class described, a driving shaft; a hub mounted on said driving shaft concentric thereof and rotatable in unison therewith; a plurality of spaced cylinders arranged circumferentially about said hub and carried thereby and opening at their inner ends into a common space; a piston slidably mounted in each of said cylinders; a piston rod connected to each of said cylinders; guide means carried by said hub for each of said piston rods for guiding the same upon slidable movement of the pistons, said cylinders being adapted for the reception of liquid; a conduit for connecting the outer ends of oppositely disposed cylinders in communication with each other; a valve interposed in said conduit for controlling communication of the outer ends of oppositely disposed cylinders with each other; a transmitting shaft; a cam-carrying member mounted on said transmitting shaft and rotatable in unison therewith; a cam on said carrying member; and means carried by each of said piston rods engageable with said cam for effecting a reciprocation of said pistons upon rotation of said driving shaft.

6. In an hydraulic transmission of the class described, a driving shaft; a hub mounted on said driving shaft concentric thereof and rotatable in unison therewith; a plurality of spaced cylinders arranged circumferentially about said hub and carried thereby and opening at their inner ends into a common space; a piston slidably mounted in each of said cylinders; a piston rod connected to each of said cylinders; guide means carried by said hub for each of said piston rods for guiding the same upon slidable movement of the pistons, said cylinders being adapted for the reception of liquid; a conduit for connecting the outer ends of oppositely disposed cylinders in communication with each other; a valve interposed in said conduit for controlling communication of the outer ends of oppositely disposed cylinders with each other; a transmitting shaft; a cam-carrying member mounted on said transmitting shaft and rotatable in unison therewith; a cam on said carrying member; and means carried by each of said piston rods engageable with said cam for effecting a reciprocation of said pistons upon rotation of said driving shaft, the movement of said valve to closed position effecting a retarding of the reciprocation of said pistons, the retarding of said pistons upon the rotation of said driving shaft effecting a rotation of said transmitting shaft; and means operable upon the rotation of said driving shaft at predetermined speeds for closing said valve.

FORTUNATO AJERO.